(12) United States Patent
Bohrer et al.

(10) Patent No.: US 10,382,350 B2
(45) Date of Patent: Aug. 13, 2019

(54) MAINTAINING PACKET ORDER IN OFFLOAD OF PACKET PROCESSING FUNCTIONS

(71) Applicant: Mellanox Technologies, Ltd., Yokneam (IL)

(72) Inventors: Dror Bohrer, Nesher (IL); Noam Bloch, Bat Shlomo (IL); Lior Narkis, Petach Tikva (IL); Hillel Chapman, Ramat Hashofet (IL); Gilad Hammer, Kiryat Ono (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 15/701,459

(22) Filed: Sep. 12, 2017

(65) Prior Publication Data
US 2019/0081904 A1 Mar. 14, 2019

(51) Int. Cl.
*G06F 9/455* (2018.01)
*H04L 12/741* (2013.01)
(Continued)

(52) U.S. Cl.
CPC ...... *H04L 47/6235* (2013.01); *G06F 9/45558* (2013.01); *H04L 47/20* (2013.01);
(Continued)

(58) Field of Classification Search
CPC .. H04L 47/6235; H04L 47/20; G06F 9/45558
(Continued)

(56) References Cited

U.S. PATENT DOCUMENTS 5,901,496 A    5/1999   Woodruff
7,657,659 B1 *  2/2010  Lambeth ............. G06F 9/45558
                                          370/471
(Continued)

FOREIGN PATENT DOCUMENTS

EP      1657878 A1    5/2006
EP      2463782 A2    6/2012
WO      2010062679    6/2010

OTHER PUBLICATIONS

U.S. Appl. No. 15/146,013 office action dated May 18, 2018.
(Continued)

*Primary Examiner* — Christopher R Crompton
(74) *Attorney, Agent, or Firm* — Kligler & Associates

(57) ABSTRACT

Network interface apparatus includes a host interface and a network interface, which receives packets in multiple packet flows destined for one or more virtual machines running on a host processor. Packet processing circuitry receives a first instruction from the host processor to offload preprocessing of the data packets in a specified flow in accordance with a specified rule, and initiates preprocessing of the data packets while writing one or more initial data packets from the specified flow to a temporary buffer. Upon subsequently receiving a second instruction to enable the specified rule, the initial data packets are delivered from the temporary buffer, after preprocessing by the packet processing circuitry, directly to a virtual machine to which the specified flow is destined, followed by preprocessing and delivery of subsequent data packets in the specified flow to the virtual machine.

12 Claims, 3 Drawing Sheets

(51) Int. Cl.
*H04L 12/813* (2013.01)
*H04L 12/863* (2013.01)
*H04L 12/931* (2013.01)

(52) U.S. Cl.
CPC .... *G06F 2009/45595* (2013.01); *H04L 45/74* (2013.01); *H04L 49/70* (2013.01)

(58) Field of Classification Search
USPC .......................................................... 370/412
See application file for complete search history.

(56) References Cited

U.S. PATENT DOCUMENTS

| | | | |
|---|---|---|---|
| 8,006,297 B2 | 8/2011 | Johnson et al. | |
| 8,103,785 B2 | 1/2012 | Crowley et al. | |
| 8,824,492 B2 | 9/2014 | Wang et al. | |
| 2003/0023846 A1 | 1/2003 | Krishna et al. | |
| 2004/0057434 A1 | 3/2004 | Poon et al. | |
| 2004/0158710 A1 | 8/2004 | Buer et al. | |
| 2005/0102497 A1 | 5/2005 | Buer | |
| 2009/0086736 A1 | 4/2009 | Foong et al. | |
| 2010/0228962 A1 | 9/2010 | Simon et al. | |
| 2012/0314709 A1 | 12/2012 | Post et al. | |
| 2013/0080651 A1 | 3/2013 | Pope et al. | |
| 2013/0125125 A1 | 5/2013 | Karin et al. | |
| 2013/0263247 A1 | 10/2013 | Jungck et al. | |
| 2013/0329557 A1 | 12/2013 | Petry | |
| 2014/0185616 A1* | 7/2014 | Bloch ................. | G06F 9/45533 370/392 |
| 2015/0100962 A1* | 4/2015 | Morita ................ | G06F 9/45558 718/1 |
| 2016/0330112 A1 | 11/2016 | Raindel et al. | |
| 2016/0330301 A1 | 11/2016 | Raindel et al. | |
| 2016/0342547 A1 | 11/2016 | Liss et al. | |
| 2016/0350151 A1* | 12/2016 | Zou ..................... | G06F 9/45558 |
| 2016/0378529 A1* | 12/2016 | Wen ........................ | G06F 21/00 718/1 |
| 2017/0237672 A1 | 8/2017 | Dalal | |
| 2018/0004954 A1* | 1/2018 | Liguori ................ | H04L 9/3263 |
| 2018/0219770 A1* | 8/2018 | Wu ..................... | G06F 9/45558 |
| 2018/0219772 A1* | 8/2018 | Koster ................. | H04L 45/586 |
| 2018/0329828 A1* | 11/2018 | Apfelbaum ......... | G06F 12/1027 |

OTHER PUBLICATIONS

Shirey., "Internet Security Glossary, Version 2", Request for Comments 4949, 365 pages, Aug. 2007.

Information Sciences Institute, "Transmission Control Protocol; DARPA Internet Program Protocol Specification", Request for Comments 793, 90 pages, Sep. 1981.

U.S. Appl. No. 15/146,013 office action dated Oct. 3, 2017.

Stevens., "TCP Slow Start, Congestion Avoidance, Fast Retransmit, and Fast Recovery Algorithms", Request for Comments 2001, 6 pages, Jan. 1997.

Netronome Systems, Inc., "Open vSwitch Offload and Acceleration with Agilio® CX SmartNICs", White Paper, 7 pages, Mar. 2017.

InfiniBand TM Architecture Specification vol. 1, Release 1.3, 1842 pages, Mar. 3, 2015.

PCI Express® Base Specification ,Revision 3.0, 860 pages, Nov. 10, 2010.

U.S. Appl. No. 15/145,983 office action dated Mar. 7, 2018.

U.S. Appl. No. 15/154,945 office action dated Apr. 5, 2018.

International Application # PCT/IB2018/058705 search report dated Feb. 18, 2019.

International Application # PCT/IB2018/059824 search report dated Mar. 22, 2019.

* cited by examiner

MAINTAINING PACKET ORDER IN OFFLOAD OF PACKET PROCESSING FUNCTIONS

FIELD OF THE INVENTION

The present invention relates generally to computer networks, and particularly to devices and methods for interfacing between host computers and a network.

BACKGROUND

A network interface controller (NIC) is a device that manages and transfers communications between a host computer (referred to alternatively simply as a "host") and a network, such as a local area network or switch fabric. The NIC directs packets from the network to their destination in the computer, for example by placing the packets in a buffer of a destination application in the computer memory, and directs outgoing packets, for example sending them either to the network or to a loopback port.

When a host computer supports multiple virtual machines (VMs), different approaches may be taken by the NIC in handling incoming and outgoing packets. In one approach, all packets are directed to a virtual machine monitor (VMM, also known as a hypervisor) running on the host, and the VMM directs the packets to the specific destination virtual machine. More recently, however, NICs have been developed with the capability of exposing multiple virtual NICs (vNICs) to software running on the host. In a model that is known as single-root I/O virtualization (SR-IOV), each VM interacts with its own corresponding vNIC, which appears to the VM to be a dedicated hardware NIC. The vNIC links the VM to other machines (virtual and/or physical) on a network, possibly including other virtual machines running on the same host. In this regard, the NIC acts as a virtual switch, connecting each of the virtual machines to a network while allowing multiple vNICs to share the same physical network port.

A variety of NICs that support the SR-IOV model are known in the art. For example, U.S. Patent Application Publication 2014/0185616, whose disclosure is incorporated herein by reference, describes a NIC that supports multiple virtualized (tenant) networks overlaid on a data network. Upon receiving a work item submitted by a virtual machine running on a host processor, the NIC identifies the tenant network over which the virtual machine is authorized to communicate, generates a data packet containing an encapsulation header that is associated with the tenant network, and transmits the data packet over the network. The NIC may also decapsulate encapsulated data packets received from the data network and convey the decapsulated data packets to the virtual machine.

SUMMARY

Embodiments of the present invention that are described hereinbelow provide improved network interface devices and methods for processing packets received by a host computer from a network.

There is therefore provided, in accordance with an embodiment of the invention, network interface apparatus, including a host interface for connection to a host processor having a memory, and a network interface, which is configured to receive over a network data packets in multiple packet flows destined for one or more virtual machines running on the host processor. Packet processing circuitry is coupled between the network interface and the host interface and is configured to pass the data packets to a virtual machine monitor (VMM) running on the host processor for preprocessing of the packets by the VMM, which delivers the preprocessed packets to the one or more virtual machines.

The packet processing circuitry is configured to receive a first instruction to offload from the VMM preprocessing of the data packets in a specified flow in accordance with a specified rule, and responsively to the first instruction to initiate preprocessing the data packets in the specified flow by the packet processing circuitry in accordance with the specified rule while writing one or more initial data packets from the specified flow to a temporary buffer, and upon subsequently receiving a second instruction to enable the specified rule, to deliver the initial data packets from the temporary buffer, after preprocessing by the packet processing circuitry, directly to a virtual machine to which the specified flow is destined, and after delivering the preprocessed initial data packets, to continue preprocessing and delivering subsequent data packets in the specified flow to the virtual machine.

In some embodiments, the first instruction causes the packet processing circuitry to modify headers of the data packets in the specified flow.

In the disclosed embodiments, the packet processing circuitry is configured to deliver the initial and subsequent data packets to the virtual machine in accordance with an order in which the data packets were received from the network, such that the subsequent data packets are delivered to the virtual machine only after delivery to the virtual machine of all the data packets in the temporary buffer. In one embodiment, the packet processing circuitry is configured to write to the temporary buffer any of the subsequent data packets that are received from the network before the temporary buffer has been emptied.

Additionally or alternatively, the packet processing circuitry in configured, in response to the first instruction, to verify that all of the data packets already received through the network interface in the specified flow have been passed to the VMM, and then to submit an acknowledgment to the VMM that the first instruction was received by the packet processing circuitry. In a disclosed embodiment, the VMM issues the second instruction upon receiving the acknowledgment.

In some embodiments, the packet processing circuitry includes a transmit pipe, for processing outgoing packets for transmission to the network, and a receive pipe, for processing incoming data packets received from the network, and the packet processing circuitry is configured to deliver the initial preprocessed data packets from the temporary buffer to the virtual machine by loopback from the temporary buffer through the transmit pipe to the receive pipe, which writes the preprocessed data packets to another buffer in the memory that is assigned to the virtual machine.

There is also provided, in accordance with an embodiment of the invention, a method for communication, which includes receiving in a network interface controller (NIC) over a network data packets in multiple packet flows destined for one or more virtual machines running on a host processor coupled to the NIC. The data packets are passed from the NIC to a virtual machine monitor (VMM) running on the host processor for preprocessing of the packets by the VMM, which delivers the preprocessed packets to the one or more virtual machines. The NIC receives a first instruction to offload from the VMM preprocessing of the data packets in a specified flow in accordance with a specified rule and responsively to the first instruction, initiates preprocessing the data packets in the specified flow by the NIC in accordance with the specified rule. After receiving the first instruction, the NIC writes one or more initial data packets from the NIC to a temporary buffer. Upon subsequently receiving a second instruction to enable the specified rule, the NIC delivers the initial data packets, after preprocessing by the NIC, from the temporary buffer directly to a virtual machine to which the specified flow is destined. After delivering the preprocessed initial data packets, the NIC continues to preprocess and deliver subsequent data packets in the specified flow to the virtual machine.

The present invention will be more fully understood from the following detailed description of the embodiments thereof, taken together with the drawings in which:

DETAILED DESCRIPTION OF EMBODIMENTS

Figure 1:
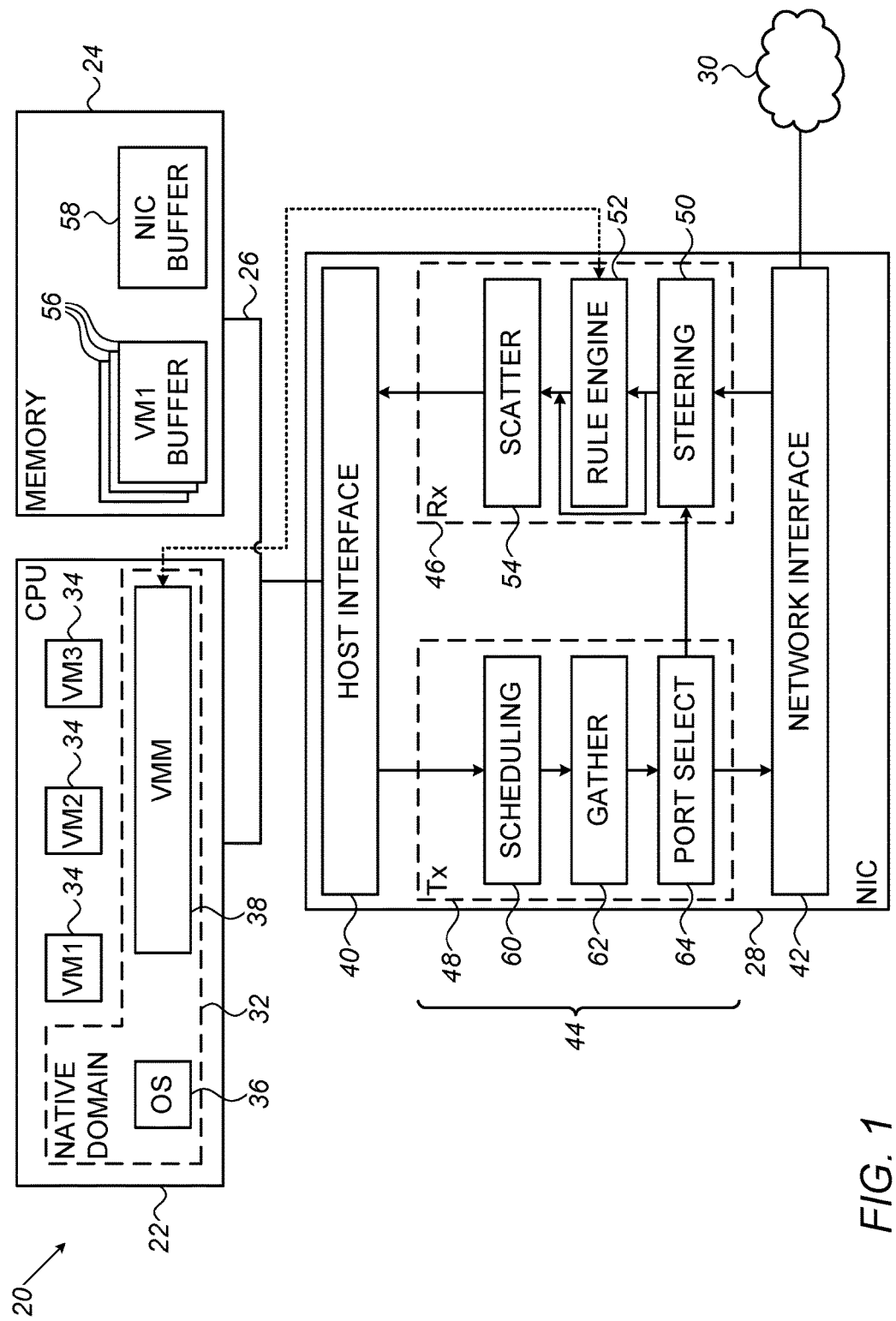
FIG. 1 is a block diagram that schematically illustrates a computer with a NIC, in accordance with an embodiment of the present invention.

In many practical applications in which virtual machines run on a server, packets transmitted between a network and the virtual machines are handled, as a default, by the VMM, even when the NIC has SR-IOV and/or other offload capabilities. The VMM preprocesses the packets by applying different rules to different packet flows, typically involving modifications to the headers of the data packets, and then delivers the preprocessed packets to the destination virtual machines. (Such header modifications include, for example, rewriting the packet headers themselves and/or adding or removing header fields to encapsulate and decapsulate packets that are tunneled through the network.) In some cases, however, such as heavy flows carrying large amounts of traffic, the VMM may decide to offload these preprocessing functions to the NIC and thus reduce the processing load on the host processor.

A flow, in the context of the present description and the claims, refers to a sequence of packets transmitted from a given source to a specified destination. The flow can be identified, for example, by the Internet Protocol (IP) 5-tuple of header fields, comprising the source and destination addresses, source and destination ports, and protocol identifier. As another example, in InfiniBand™ networks, a flow can be identified by the queue pair (QP) number in the packet transport header.

When the VMM decides to offload preprocessing of a given flow to the NIC, the virtual machine will subsequently receive and transmit packets directly via the NIC, without additional processing by the VMM. The transition from VMM-based to NIC-based preprocessing should ideally be transparent to the virtual machine and should take place without loss or delay of packets that have already been transmitted. Because of the high processing speed of the NIC, however, when the VMM initiates an offload in the middle of a given flow, the NIC may begin delivering preprocessed incoming packets in the flow to the virtual machine before the VMM has finished preprocessing and delivered the last of the packets that were received before the offload was initiated. The virtual machine will consequently receive packets out of order. It is possible to avoid this problem by instructing the sender of the incoming flow to pause transmission until the VMM has emptied its preprocessing queue, but this approach increases communication latency and degrades bandwidth. As another alternative, the virtual machines can be configured to handle out-of-order packets in software, but this solution similarly increases latency and adds to the load on the host processor.

Embodiments of the present invention that are described herein address this problem by coordination between the VMM and the NIC, in a manner that is transparent both to the sender of the flow in question and to the virtual machine receiving the flow and avoids any degradation of communication bandwidth or latency. These embodiments use a new two-stage mechanism, in which the VMM first sends an instruction to the NIC to initiate preprocessing of the data packets in a specified flow in accordance with a specified rule. The NIC prepares to apply the rule and sends an acknowledgment to the VMM. Only after having emptied its own queue of incoming packets in the flow, however, does the VMM send a second instruction to the NIC to enable the rule, i.e., to begin passing preprocessed packets to the virtual machine to which the flow is destined.

After receiving the first instruction, the NIC prepares to begin preprocessing the specified flow and temporarily buffers any incoming packets in the flow. After receiving the second instruction, the NIC first empties the temporary buffer and passes the buffered packets (after preprocessing) to the virtual machine. Once the temporary buffer is empty, the NIC continues preprocessing incoming packets in the specified flow, and delivers subsequent packets directly to the virtual machine. Thus, all packets are preprocessed and delivered to the virtual machine in the proper order.

FIG. 1 is a block diagram that schematically illustrates a computer 20 with a NIC 28, in accordance with an embodiment of the present invention. Computer 20 comprises a host processor in the form of a central processing unit (CPU) 22, with a memory 24, typically comprising random-access memory (RAM). NIC 28 is connected to CPU 22 and memory 24 via a bus 26, such as a Peripheral Component Interconnect Express® (PCIe®) bus, as is known in the art. NIC 28 couples computer 20 to a packet network 30, such as an Ethernet, IP or InfiniBand network.

Computer 20 supports a virtual machine environment, in which multiple virtual machines 34 (labeled VM1, VM2, VM3 in FIG. 1) may run on CPU 22. The software running on CPU 22, including both operating system and application programs, may be downloaded to the CPU in electronic form, over a network for example. Additionally or alternatively, the software may be stored on tangible, non-transitory computer-readable media, such as optical, magnetic or electronic memory media, which may be embodied in memory 24.

CPU 22 operates a native domain 32, with a host operating system 36, which may support host user applications and other native processes. In addition, the CPU concurrently runs one or more virtual machines 34, as noted above, each with its own guest operating system and guest user applications (omitted for the sake of simplicity). VMM 38 in native domain 32 interacts with the kernels of the guest operating systems of virtual machines 34 in a manner that emulates the host processor and allows the virtual machines to share the resources of CPU 22. A wide range of virtual machine software of this sort is available commercially, and further description is beyond the scope of the present disclosure. The added capabilities of VMM 38, in terms of initiating and enabling offload of rules to NIC 28, are described further hereinbelow, particularly with reference to FIGS. 2 and 3.

NIC 28 comprises a host interface 40, for connection to CPU 22 and memory 24 via bus 26, and a network interface 42, comprising one or more ports connected to network 30. Network interface 42 transmits and receives data packets in multiple packet flows from and to virtual machines 34 running on the CPU 22. The packets are processed by packet processing circuitry 44, which is coupled between host interface 40 and network interface 42 and comprises a receive (Rx) pipe 46, for processing incoming data packets received from network 30, and a transmit (Tx) pipe 48, for processing outgoing packets for transmission to the network. The description that follows relates primarily to preprocessing rules applied by Rx pipe 46 to incoming flows that are received from network 30. When NIC 28 receives packets in incoming flows for which VMM 38 has not offloaded preprocessing functions to the NIC, Rx pipe 46 passes the packets to VMM 38, which preprocesses the packets in accordance with applicable rules and delivers the preprocessed packets in each flow to the destination virtual machine 34.

In Rx pipe 46, steering logic 50 identifies, for each incoming packet, the flow to which the packet belongs and the process running on CPU 22 to which the packet is to be delivered. In order to make this decision, steering logic 50 extracts a flow identifier from the packet, typically based on one or more packet header fields, such as the IP 5-tuple and/or a transport-layer value. Steering logic 50 looks up the flow in a database (not shown), which also indicates whether any preprocessing rules have been initiated and enabled on NIC 28 by VMM 38. If so, a rule engine 52 preprocesses the packets in the flow, for example by modifying the packet headers (changing and/or removing or adding specified header fields). For flows for which preprocessing is not enabled, the incoming packets may bypass rule engine 52.

A scatter engine 54 in receive pipe 46 then writes the packets to respective buffers in memory 24 by direct memory access (DMA) over bus 26. For flows that are not preprocessed by rule engine 52, scatter engine 54 delivers the packets to VMM 38 for preprocessing and delivery to the appropriate destination. When rule engine 52 has preprocessed a packet in a particular flow, scatter engine 54 delivers the packet directly to the destination virtual machine 34 by writing the packet to a dedicated buffer 56. Receive pipe 46 notifies the virtual machine that the packet is available for reading, for example by placing a completion report in a completion queue that is read by the virtual machine.

On the other hand, when receive pipe 46 has received an instruction from VMM 38 to initiate preprocessing the data packets in a specified flow, but has not yet received a second instruction to enable the specified preprocessing rule, scatter engine 54 may write one or more initial data packets from the specified flow to a temporary buffer 58, typically without preprocessing the packets. Buffer 58 may conveniently be allocated in memory 24, as shown in FIG. 1. In an alternative embodiment (not shown in the figures), NIC may hold buffer 58 in a separate memory that is dedicated to the NIC. Upon subsequently receiving the instruction to enable preprocessing, receive pipe 46 will deliver the initial data packets, after appropriate preprocessing by rule engine 52, from temporary buffer 58 to the appropriate dedicated buffer 56 of the destination virtual machine 34. Receive pipe 46 delivers the packets to buffer 56 in the order in which the packets were received from network 30. Thereafter, rule engine 52 will continue preprocessing further incoming packets in the specified flow, and scatter engine 54 will deliver these preprocessed packets in the proper order to buffer 56.

To ensure that proper packet handling and ordering are maintained, the initial data packets that were stored in temporary buffer 58 can be delivered to destination virtual machine 34 by loopback from temporary buffer 58 through transmit pipe 48 to receive pipe 46, which then writes the preprocessed data packets to the dedicated buffer 56 that is assigned to the virtual machine. Tx pipe 48 comprises scheduling logic 60, which arbitrates among transmission requests and can be configured to give priority to loopback requests from buffer 58. A gather engine 62 reads the packets that are to be transmitted from memory 24, and port selection logic 64 selects the port through which each packet is to be transmitted. Outgoing packets are transmitted via network interface 42 to network 30.

Loopback packets, however, including packets from temporary buffer 58, are returned to steering logic 50 for delivery to the appropriate destination process. Steering logic 50 thus ensures that the packets that were written to buffer 58 from a given flow (prior to enablement of rule engine 52 for the flow) are looped back to dedicated buffer 56 in order, before preprocessing and writing any data packets received subsequently from network 30. These subsequent data packets are written to dedicated buffer 56 only after delivery of all the data packets held in temporary buffer 58 for this flow. If any of these subsequent data packets are received from network 30 before temporary buffer 58 has been emptied (even if the rule for this flow has already been enabled), steering logic 50 will direct these packets, as well, to temporary buffer 58, in order to ensure that proper ordering is maintained in writing packets to buffer 56.

Figure 2:
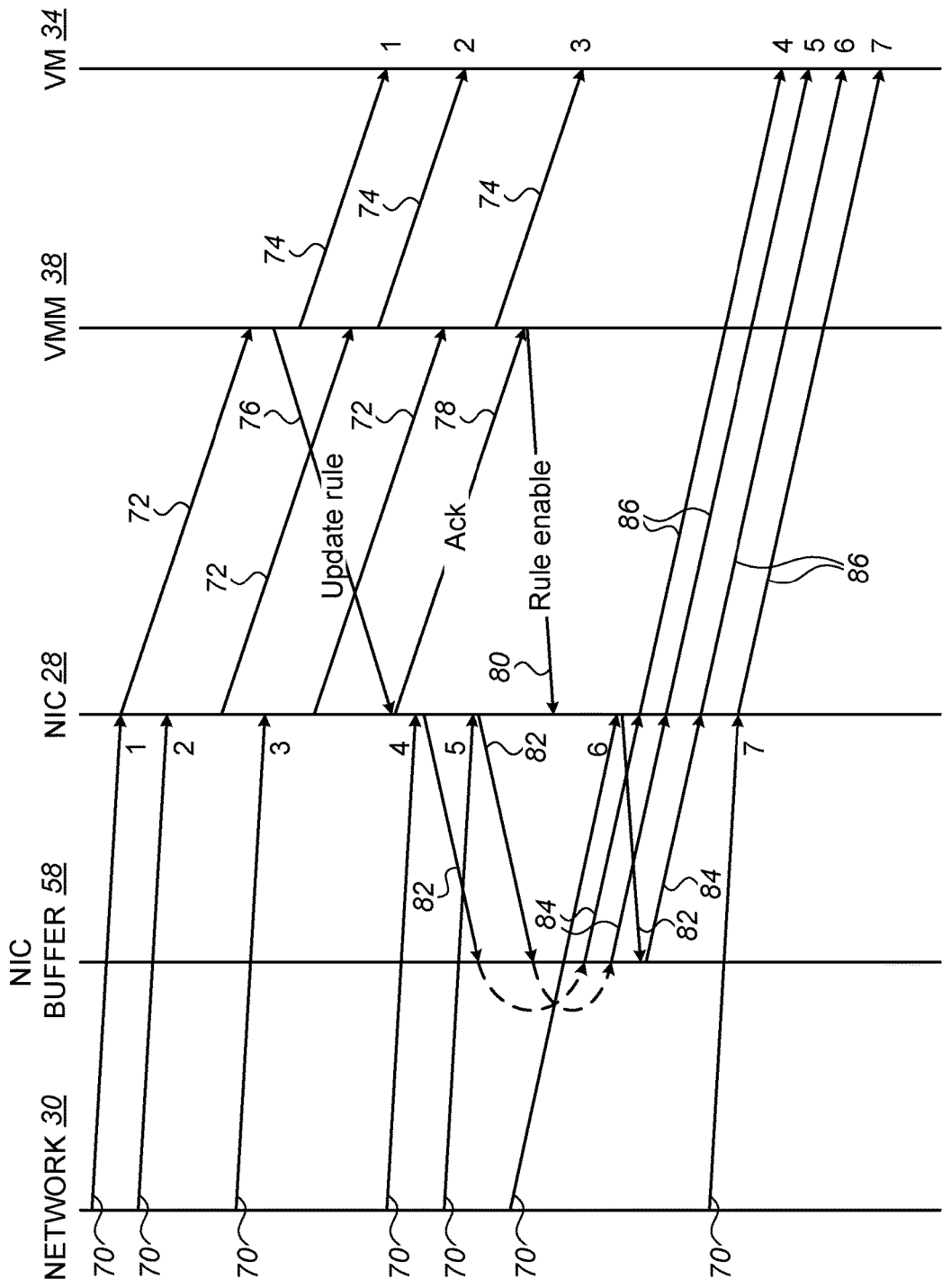
FIG. 2 is a ladder diagram that schematically illustrates a method for offload to a NIC of a processing function applied to a packet flow, in accordance with an embodiment of the invention.
Figure 3:
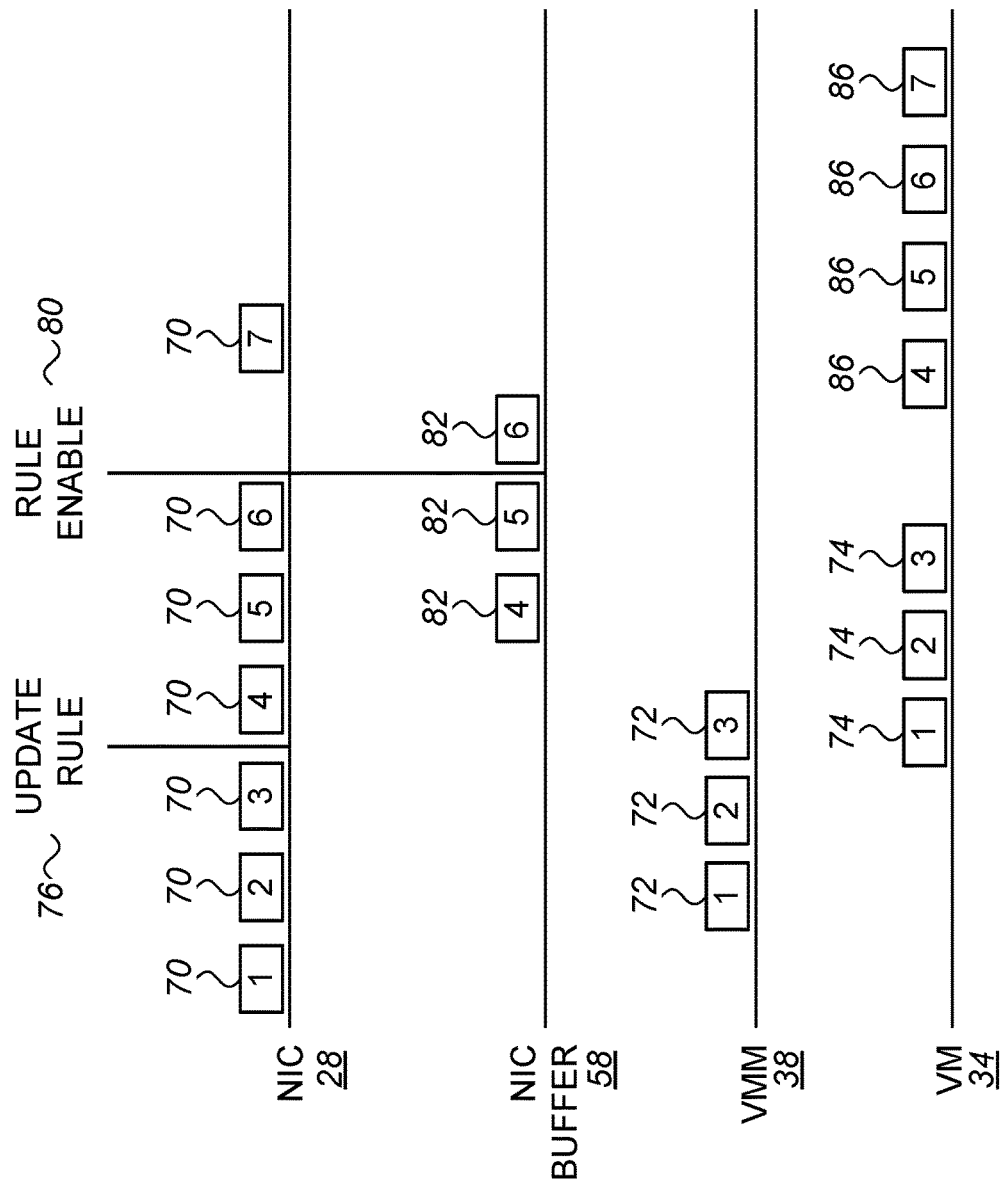
FIG. 3 is a block diagram that schematically illustrates processing and delivery of packets to a destination virtual machine in accordance with the method shown in FIG. 2.

Reference is now made to FIGS. 2 and 3, which schematically illustrate a method for offload to NIC 28 of a preprocessing function applied to a certain packet flow, in accordance with an embodiment of the invention. FIG. 2 is a ladder diagram illustrating communications exchanged among the elements of computer 20 in the carrying out this method, while FIG. 3 is a block diagram showing stages in the processing and delivery of packets to destination virtual machine 34 in accordance with the method. Although this example relates to a single flow for the sake of simplicity, in general NIC 28 receives and handles many flows concurrently, and may offload the preprocessing of multiple flows in parallel according to respective rules, which may differ from flow to flow.

Furthermore, although this example is described, for the sake of concreteness and clarity, with reference to the specific hardware architecture of NIC 28 that is shown in FIG. 1, the principles of the method of FIGS. 2 and 3 may similarly be implemented by other suitable sorts of network interface devices, as are known in the art. All such alternative implementations are considered to be within the scope of the present invention.

Initially, as a default, VMM 38 performs the required preprocessing of packets in the flow shown in FIGS. 2 and 3. Therefore, upon receiving incoming packets 70, NIC 28 simply forwards corresponding packet data 72 to VMM 38. VMM 38 preprocesses the packet in accordance with the applicable rule, and then delivers preprocessed packets 74 to the destination virtual machine 34, for example by placing the packet data in the appropriate dedicated buffer 56 in memory 24. This default procedure is applied to packets #1, #2 and #3 in FIGS. 2 and 3.

After preprocessing packet #1, however, VMM 38 concludes that preprocessing of this flow should be offloaded to NIC 28. This decision can be based, for example, on a count or data rate of incoming packets in the flow, or on any other applicable criteria. Upon making the decision, VMM 38 sends an "update rule" instruction 76 to rule engine 52 in NIC 28, instructing the rule engine to offload preprocessing of the data packets in this flow in accordance with a specified rule. In the meanwhile, until instruction 76 is received in NIC 28, steering logic 50 continues to direct packet data 72 (corresponding to packets #2 and #3) to VMM 38, and VMM 38 continues to preprocess and deliver packets 74 to buffer 56.

In response to instruction 76, packet processing circuitry 44 verifies that all of the data packets already received through network interface 42 in this flow have been passed to VMM 38, and then submits an acknowledgment 78 to the VMM to confirm that instruction 76 was received. Following submission of acknowledgment 78, steering logic 50 begins to direct packet data 82 from incoming packets 70 to temporary buffer 58, as illustrated by packets #4 and #5. Steering logic 50 continues handling the flow in this manner until VMM 38 has received acknowledgment 78 and, in response, sends a "rule enable" instruction 80 to rule engine 52.

Upon receiving instruction 80, packet processing circuitry 44 begins looping back packet data 84 from temporary buffer 58, through transmit pipe 48, to steering logic 50. Steering logic 50 now passes the looped-back packets to rule engine 52 for preprocessing in accordance with the rule specified by instruction 76, and then directs corresponding preprocessed packets 86 to dedicated buffer 56 of the destination virtual machine 34. Steering logic 50 passes subsequent data packets 70 in the flow, such as packets #6 and #7, to rule engine 52 only after delivery to the virtual machine of all the data packets belonging to this flow in temporary buffer 58. In the pictured example, packet #6 reaches NIC 28 from network 30 before packet #5 has been emptied from temporary buffer 58. Therefore, packet #6 is also written to and then looped back from temporary buffer 58 after packet #5. Packet #7 and subsequent packets in the flow, however, are preprocessed by rule engine 52 and written by scatter engine 54 directly to dedicated buffer 56.

Thus, all packets in the flow are delivered to dedicated buffer 56 in the proper order, without requiring virtual machine 34 to be aware of the offload in mid-flow, and without exerting any back-pressure on network 30.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Network interface apparatus, comprising:
   a host interface for connection to a host processor having a memory;
   a network interface, which is configured to receive over a network data packets in multiple packet flows destined for one or more virtual machines running on the host processor; and
   packet processing circuitry, which is coupled between the network interface and the host interface and is configured to pass the data packets to a virtual machine monitor (VMM) running on the host processor for preprocessing of the packets by the VMM, which delivers the preprocessed packets to the one or more virtual machines,
   wherein the packet processing circuitry is configured to receive a first instruction to offload from the VMM preprocessing of the data packets in a specified flow in accordance with a specified rule, and responsively to the first instruction to initiate preprocessing the data packets in the specified flow by the packet processing circuitry in accordance with the specified rule while writing one or more initial data packets from the specified flow to a temporary buffer, and upon subsequently receiving a second instruction to enable the specified rule, to deliver the initial data packets from the temporary buffer, after preprocessing by the packet processing circuitry, directly to a virtual machine to which the specified flow is destined, and after delivering the preprocessed initial data packets, to continue preprocessing and delivering subsequent data packets in the specified flow to the virtual machine,
   wherein the packet processing circuitry comprises a transmit pipe, for processing outgoing packets for transmission to the network, and a receive pipe, for processing incoming data packets received from the network, and
   wherein the packet processing circuitry is configured to deliver the initial preprocessed data packets from the temporary buffer to the virtual machine by loopback from the temporary buffer through the transmit pipe to the receive pipe, which writes the preprocessed data packets to another buffer in the memory that is assigned to the virtual machine.

2. The apparatus according to claim 1, wherein the first instruction causes the packet processing circuitry to modify headers of the data packets in the specified flow.

3. The apparatus according to claim 1, wherein the packet processing circuitry is configured to deliver the initial and subsequent data packets to the virtual machine in accordance with an order in which the data packets were received from the network, such that the subsequent data packets are delivered to the virtual machine only after delivery to the virtual machine of all the data packets in the temporary buffer.

4. The apparatus according to claim 3, wherein the packet processing circuitry is configured to write to the temporary buffer any of the subsequent data packets that are received from the network before the temporary buffer has been emptied.

5. The apparatus according to claim 1, wherein the packet processing circuitry in configured, in response to the first instruction, to verify that all of the data packets already received through the network interface in the specified flow have been passed to the VMM, and then to submit an acknowledgment to the VMM that the first instruction was received by the packet processing circuitry.

6. The apparatus according to claim 5, wherein the VMM issues the second instruction upon receiving the acknowledgment.

7. A method for communication, comprising:
   receiving in a network interface controller (NIC) over a network data packets in multiple packet flows destined for one or more virtual machines running on a host processor coupled to the NIC;
   passing the data packets from the NIC to a virtual machine monitor (VMM) running on the host processor for preprocessing of the packets by the VMM, which delivers the preprocessed packets to the one or more virtual machines;

receiving in the NIC a first instruction to offload from the VMM preprocessing of the data packets in a specified flow in accordance with a specified rule;

responsively to the first instruction, initiating preprocessing the data packets in the specified flow by the NIC in accordance with the specified rule;

after receiving the first instruction, writing one or more initial data packets from the NIC to a temporary buffer;

upon subsequently receiving a second instruction to enable the specified rule, delivering the initial data packets, after preprocessing by the NIC, from the temporary buffer directly to a virtual machine to which the specified flow is destined; and after delivering the preprocessed initial data packets, continuing in the NIC to preprocess and deliver subsequent data packets in the specified flow to the virtual machine, wherein the NIC comprises a transmit pipe, for processing outgoing packets for transmission to the network, and a receive pipe, for processing incoming data packets received from the network, and wherein delivering the initial preprocessed data packets from the temporary buffer to the virtual machine comprises looping back the data packets from the temporary buffer through the transmit pipe to the receive pipe, which writes the preprocessed data packets to another buffer in the memory that is assigned to the virtual machine.

8. The method according to claim 7, wherein preprocessing the data packets comprises modifying headers of the data packets in the specified flow.

9. The method according to claim 7, wherein delivering the initial data packets and the subsequent data packets comprises passing the data packets in the specified flow to the virtual machine in accordance with an order in which the data packets were received from the network, such that the subsequent data packets are delivered to the virtual machine only after delivery to the virtual machine of all the data packets in the temporary buffer.

10. The method according to claim 9, wherein writing the one or more initial data packets to the temporary buffer comprises writing to the temporary buffer any of the subsequent data packets that are received from the network before the temporary buffer has been emptied.

11. The method according to claim 7, and comprising, in response to the first instruction, verifying in the NIC that all of the data packets already received from the network in the specified flow have been passed to the VMM, and then submitting an acknowledgment to the VMM that the first instruction was received by the NIC.

12. The method according to claim 11, wherein the VMM issues the second instruction upon receiving the acknowledgment.

* * * * *